Nov. 7, 1939.   A. J. ROSENBERGER   2,178,864
CONTROL SYSTEM AND METHOD
Filed Aug. 29, 1936   3 Sheets—Sheet 1

Inventor
Albert J. Rosenberger
by McConkey + Booth
Attorneys

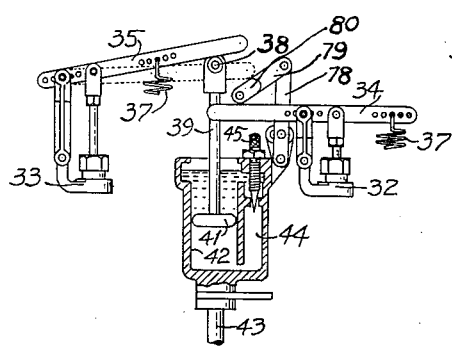
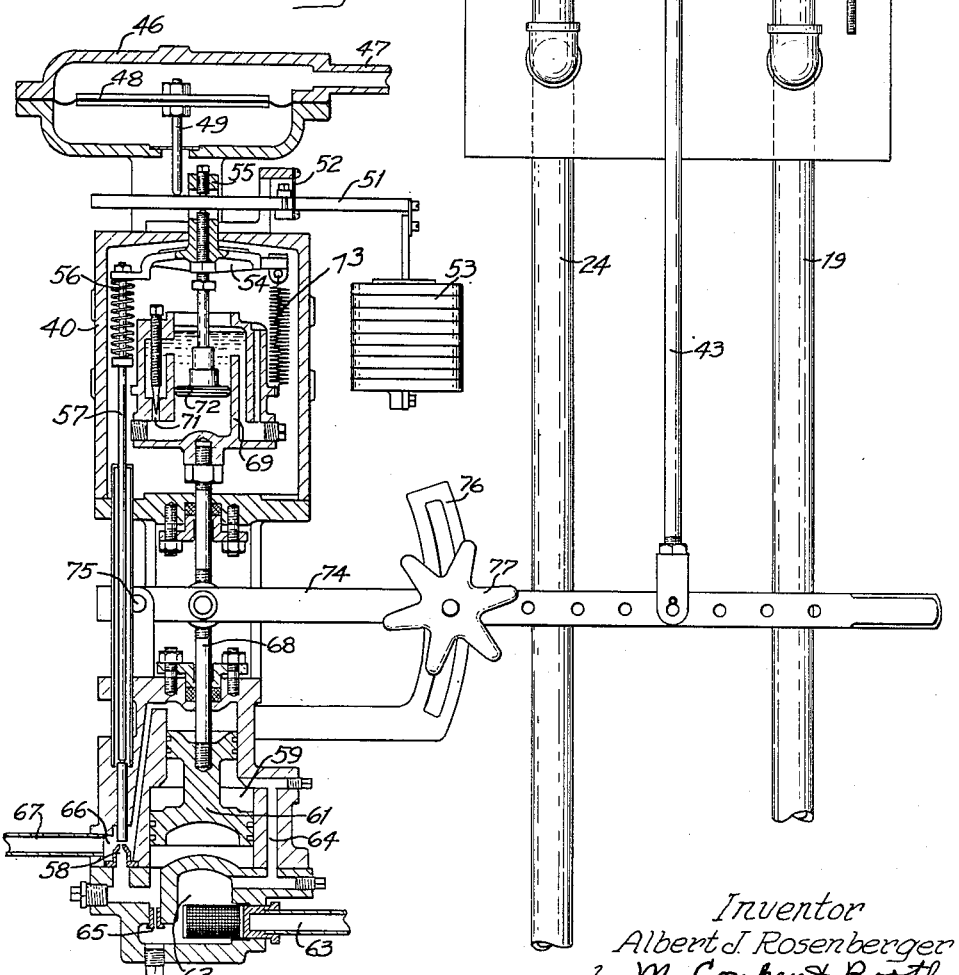

Patented Nov. 7, 1939

2,178,864

UNITED STATES PATENT OFFICE 2,178,864

CONTROL SYSTEM AND METHOD

Albert J. Rosenberger, Chicago, Ill., assignor to Republic Flow Meters Company, Chicago, Ill., a corporation of Illinois Application August 29, 1936, Serial No. 98,601

4 Claims. (Cl. 50—10)

This invention relates to a control system and method and more particularly to a system and method for regulating a condition to maintain it at a constant value. The condition may be any condition of a system to be controlled such, for example, as pressure, temperature, rate of flow, etc., and in the illustrated embodiment the system is shown controlling the quantity of liquid in a hydraulic coupling to control the speed thereof.

In regulating or controlling a condition in which there is an appreciable storage factor involved or where, for some other reason, there is a considerable lag between the controlling action and a corresponding correction of the condition, it is desirable to over-control temporarily to compensate for the storage or lag. Such storage factors result from the capacity of the system to accumulate or store appreciable quantities of the controlled medium before responding to a change in the rate of supply. For example, a mass whose temperature is to be controlled will store an appreciable quantity of heat for each degree rise in temperature or a liquid reservoir whose level is to be maintained constant will store a certain quantity of liquid for each increment in level. Therefore, to produce an increase in temperature or in liquid level in the examples given it is necessary to overcontrol to supply heat or liquid faster than it is taken out of the mass or reservoir. I have determined that this temporary over-control can be accomplished by creating an excessive controlling or regulating force or movement and gradualy cancelling such force or movement over a period of time. Thus the extent of the over-control times the time required for its cancellation represents a measure of quantity which will compensate for the storage effect and return the condition rapidly to the desired value.

Where the amount of change of the condition from the desired value is great a relatively greater quantity of compensation should be provided than where it is less and it is one of the objects of the invention to provide a control system and method in which the controlling movement or force is proportional to the amount of change of the condition.

Another object of the invention is to provide a controlling system or method in which a regulating force or movement is created and is gradually cancelled out over a period of time.

Still another object is to provide a control system in which a control force is communicated to a control element through a dashpot or the like so that the force will gradually be cancelled out.

This invention is particularly adapted to control a valve or like element which is normally held in a set position by a spring. A regulator may be employed responsive to the condition to be controlled and may be connected to the valve through a dash-pot. Thus movement of the regulator, which is preferably proportional to the rate of change of the condition, will move the valve from its set position and the dashpot will gradually yield to permit the valve to return to its set position, the quantity of regulation effected being the product of the valve movement and the time it is moved from its set position.

One important application of the invention is in the control of a fluid coupling whose efficiency or degree of slip is proportional to the amount of fluid it contains. Where such a coupling controls a fan whose output pressure is to be maintained constant, a regulator may be provided responsive to such output pressure to produce a regulating force proportional to the rate of change of pressure. The regulator is preferably connected to valves, controlling the inlet of fluid to and outlet of fluid from the coupling, through a dashpot so that the movement of the valves will be proportional to the regulating force and will be maintained over a period of time determined by the dashpot. Preferably a greater quantity of oil than is necessary to compensate for the changed pressure value is added to or taken from the coupling to provide the necessary force for rapid acceleration or deceleration and the quantity is automatically corrected as the fan speed and pressure respond to the changed coupling conditions.

Other objects, advantages and novel features of the invention including particular methods and particular structural features of the system will be apparent from the following description when read in connection with the accompanying drawings in which:

Figure 3 is a view with parts in section and parts in elevation of the regulator and control elements of Figure 1;

Figure 5 is a partial view similar to Figure 3, but showing a different position.

Figure 1:
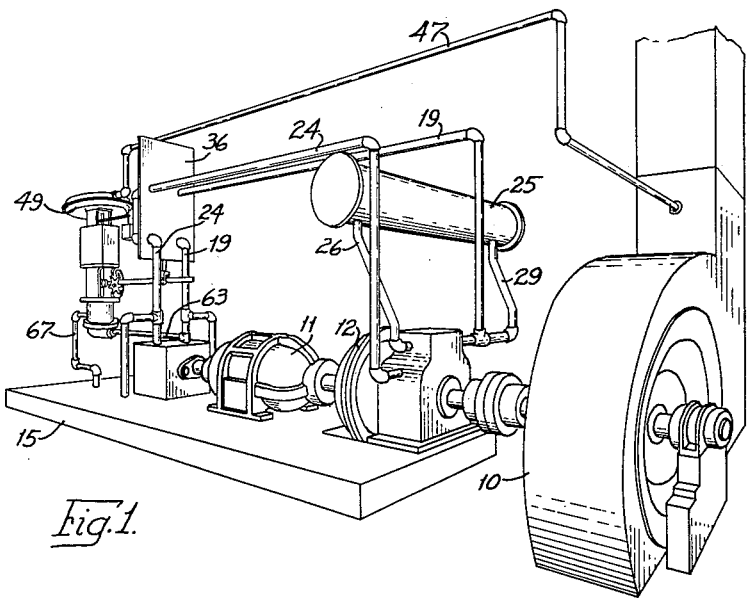
Figure 1 is a diagrammatic perspective view of a system embodying the invention.

The system shown in Figure 1 includes a blower 10, the pressure of the discharge from which is to be maintained constant and which is driven by a constant speed electric motor or the like 11. The motor and blower are connected by a hydraulic transmission having a casing 12 connected to the motor by a shaft 12' and formed with a series of impeller vanes 13 and a vaned rotor 14 rotatably mounted in the casing 12 and connected to the blower 10 by a shaft 14'. The impeller and rotor form a well known type of hydraulic coupling whose efficiency or degree of slip varies with the amount of liquid it contains so that the speed of the blower can be controlled by controlling the amount of liquid in the casing without affecting the motor speed.

Liquid may be circulated into and out of the coupling from a tank 15 which is adapted to contain a supply of oil or other suitable liquid. A gear pump 16, preferably driven by the motor 11, has an inlet pipe 17 extending into the tank and has its outlet connected to the tank by a pipe 18' through a suitable pressure relief valve 18. The pump outlet is also connected to the coupling to supply liquid thereto by a pipe 19 which leads into the casing 12 and discharges through passages in the turbine rotor into the fluid circuit formed by the vanes 13 and the rotor 14. The casing 12 has an extended portion 21 adapted to receive liquid exhausted from the circuit through calibrated leak ports 22 in the main casing 12 and a stationary scoop tube 23 is arranged in the casing portion 21 to pick up liquid therefrom and discharge it under pressure due to centrifugal force through a passage 23' and a pipe 24 which is connected to the pump inlet pipe 17.

The liquid is preferably cooled by a radiator 25 of any suitable type having an inlet pipe 26 connected to an annular collecting chamber 27 communicating with the passage 23' through a port 28. The radiator has an outlet pipe 29 connected to the inlet pipe 19 of the coupling and formed with a restriction 31. When the coupling is operating, pressure in the scoop tube will force liquid through the pipe 26 and the radiator and back through the pipe 29. Due to the restriction 31 the radiator outlet is smaller than the radiator inlet so that the radiator will always be maintained under a slight pressure sufficient to insure that it is always full of liquid. Thus the radiator contains a constant quantity of liquid at all times and does not affect control of the quantity of liquid in the coupling.

Flow of liquid to and from the coupling is controlled by a poppet type valve 32 in the pipe 19 and a similar valve 33 in the pipe 24. The valves are controlled by levers 34 and 35, respectively, which are pivotally connected to the valve bodies and the free ends of which overlap. It will be noted that the lever 34 is pivoted between the valve 32 and the overlapping ends so that when its free end is moved down the valve 32 will be opened and the lever 35 is pivoted on the side of the valve 33 remote from the overlapping ends so that when its free end is moved up, the valve 33 will be opened. The valves are preferably arranged adjacent a panel 36 and springs 37 are adjustably mounted on the panel and connected to the levers 34 and 35 to urge the valves to their closed position.

The levers 34 and 35 are operated by a roller 38 lying between their overlapping ends and carried by the upper end of a rod 39 which carries a piston 41 at its lower end. The piston 41 is slidably mounted in a dashpot cylinder 42 carried by a rod 43 and which has a bypass 44 between its end adjustable by means of a needle valve 45.

The valves 32 and 33 are controlled by a regulator including a housing 40 supporting a diaphragm casing 46 connected at its upper part to the discharge of the blower 10 by a pipe 47. The casing 46 carries a diaphragm 48 which has a rod 49 secured thereto and projecting through the lower part of the casing 46 and bearing on one end of a weigh beam 51 which is pivotally mounted intermediate its ends as by a leaf spring 52. The opposite end of the weigh beam is urged downwardly by a weight 53 which is calibrated to balance the diaphragm 48 when the desired blower outlet pressure is acting thereon.

A member 54 is mounted in the housing 40 and is adjustably connected to the weigh beam by means of a yoke 55 which carries pointed screws engaging the weigh beam. The member 54 carries by means of a yielding spring connection 56 a valve rod 57 which controls the effective size of an orifice 58 which communicates with the large lower end of a differential cylinder 59 in which a differential piston 61 is slidably mounted. Liquid under pressure is supplied to the cylinder 59 from a chamber 62 which communicates with the outlet of the pump 16 through a pipe 63 and with the center part of the cylinder 59 through a passage 64. A restricted orifice 65 connects the chamber 62 with the lower end of the cylinder 59 below the large end of the differential piston 61 and a chamber 66 receives liquid escaping through the orifice 58 and any liquid leaking past the piston and conducts it back to the tank 15 through a pipe 67.

Preferably the area of the large end of the piston 61 is just double that of the small end so that pressure admitted through the passage 64 creates a downward force equal to the unit pressure times half of the area of the large end of the piston. Under these conditions the effective areas of the orifices 58 and 65 are equal so that the pressure drop across each of them will be equal. Thus one-half of the pressure will act upwardly over the entire area of the large end of the piston and the piston will be balanced. If the valve rod 57 is moved closer to the orifice 58 the pressure below the piston will increase, causing the piston to rise, and if the rod is moved away from the orifice the pressure will drop causing the piston to fall.

The piston 61 is secured to the lower end of a rod 68 which carries at its upper end a dashpot cylinder 69 having a valved bypass 71 between its ends. A piston 72 is slidably mounted in the cylinder 69 and is connected directly with the member 54. The cylinder 69 is also connected to the member 54 by means of a spring 73 which is normally maintained under a predetermined tension to assist in balancing the weigh beam.

The regulator is connected to the rod 43 to operate the same by means of a lever 74 pivoted at 75 on the regulator frame and connected to both the rod 68 and the rod 43. If desired the regulator frame may carry a stationary bracket 76 adapted to be engaged by a manually-operable clamp member 77 by which the lever 74 may be clamped in any desired position.

When the blower discharge pressure is at the desired value the parts will occupy the position shown with the weigh beam 51 balanced and the valves 32 and 33 closed. At this time no liquid is being either supplied to or removed from the coupling and its efficiency will remain constant.

If the blower discharge pressure should increase, the diaphragm 48, rod 49 and valve stem 57 will be moved down to increase the pressure below the piston 61 and cause it to rise. This movement will raise the rod 68 and dashpot 69, urging the piston 72 up and relieving the tension of the spring 73 until the member 54 is moved up enough to return the stem 57 to its neutral position at which time movement of the piston 61 will stop. It will be apparent that a greater movement of the piston 61 will be required to raise the member 54 and stem 57 if the pressure increase on the diaphragm 48 is high than if it is low so that the amount of movement of the piston will be proportional to the pressure change.

As the piston 61 rises, the lever 74 will be swung upwardly about its pivot to raise the rod 43 and cylinder 42. The cylinder 42 is preferably filled with liquid and due to the restriction in the passage 44 movement thereof will cause a similar movement of the piston 41, rod 39 and member 38. Thus the lever 35 will be raised to open the valve 33 an amount which is directly proportional to the pressure increase. When the valve 33 is open, liquid under pressure in the scoop tube 23 will flow through the pipe 24 to the inlet of the pump 16, thereby decreasing the amount of liquid in the coupling and reducing its efficiency to reduce the speed of the blower 10 and the pressure of the blower discharge.

As soon as the valve 33 is opened its spring 37 starts pulling it back toward closed position, this being possible due to movement of the piston 41 in the cylinder 42 and to flow of liquid from one side to the other of the piston through the bypass 44. Thus an amount of liquid will be withdrawn from the coupling which is determined by the amount of valve opening and the time it remains open, the first factor being determined by the pressure variation and the regulator setting and the second by the adjustment of the valve 45 in the bypass 44.

Opening of the valve 33 will immediately result in removal of some liquid from the coupling and consequently in slowing down of the blower and reduction of pressure at the blower outlet and on the diaphragm 48. Preferably the parts are so adjusted that an excess of liquid will be withdrawn so that the coupling and fan will decelerate rapidly. As the blower speed decreases the pressure on the diaphragm 48 will be reduced and the weight 53 will tilt the weigh beam to raise the valve rod 57. Thus pressure below the differential piston 61 will be reduced and the piston will move down, exerting a pull on the dash pot piston 72 and again tensioning the spring 73 to balance the weigh beam and valve rod 57. If the parts are properly adjusted the pressure on diaphragm 48 will have returned to the desired value by the time leakage through the port 71 has relieved the pull on the piston 72 and the regulator will again be balanced with the parts in their central position as shown in Figure 3.

Due to the fact that the dashpot piston 41 has moved downwardly in the cylinder 42 under the influence of valve spring 37, downward movement of the power piston 61 will move the dash pot cylinder 42 and piston 41 downwardly to open the valve 32. This will permit the pump 16 to force liquid into the coupling through the pipe 19 to make up for the excess withdrawn to provide for rapid deceleration, thereby increasing the efficiency of the coupling and stopping further deceleration of the fan. The spring 37 will close the valve 32 and if the bypass valve 45 is properly adjusted this closing will be so timed that just the right amount of liquid is added to make up for the excess withdrawn so that the fan will be driven at the proper speed to maintain its outlet pressure at the desired value.

It will be apparent that if the bypass valve 45 were closed too far over-control and hunting might result and if it were not closed far enough under-control would result. Preferably this valve is so set as to eliminate any possibility of over-control and means are provided to prevent under-control. As shown, such means includes a link 78 pivoted to the cylinder 42 and to one end of a link 79 whose opposite end is pivoted on a fixed pivot on the panel 36 and which rigidly carries a cam 80 lying between the ends of the levers 34 and 35. As best seen in Figure 5 when the lever 35 has been raised by the piston 41 due to raising of the cylinder 42, the cam 80 will also be turned by the cylinder 42 through the linkage 78, 79. If the by-pass 44 should be too open so that the lever 35 would move downwardly too fast before the regulator had moved the cylinder 42 downwardly, the cam 80 would engage the lever 35 and hold the valve 33 open so that liquid would continue to be withdrawn from the coupling. The parts would then remain in this position until a decrease in fan outlet pressure operated the regulator to lower the cylinder 42.

The cam 80 also insures that the regulator will always return to its exact central position and hence that the fan outlet pressure will always be at the desired value. It is apparent that the position of the cylinder 42 corresponds to that of the regulator and unless the cylinder 42 is at its central position the cam 80 will hold open one of the valves 32 or 33 to add or withdraw liquid to or from the coupling. Thus the only stable position of the regulator is the centered position shown in Figure 3 and the regulator cannot remain in this position unless the pressure on the diaphragm 48 just balances the spring 73 and weight 53.

If the blower outlet pressure should decrease, the operation would be as described above except that all of the parts would move in the opposite direction. In this case the member 38 would move down to engage the lever 34, thereby to open valve 32 and admit additional liquid to the coupling to increase the blower speed and outlet pressure.

Figure 2:
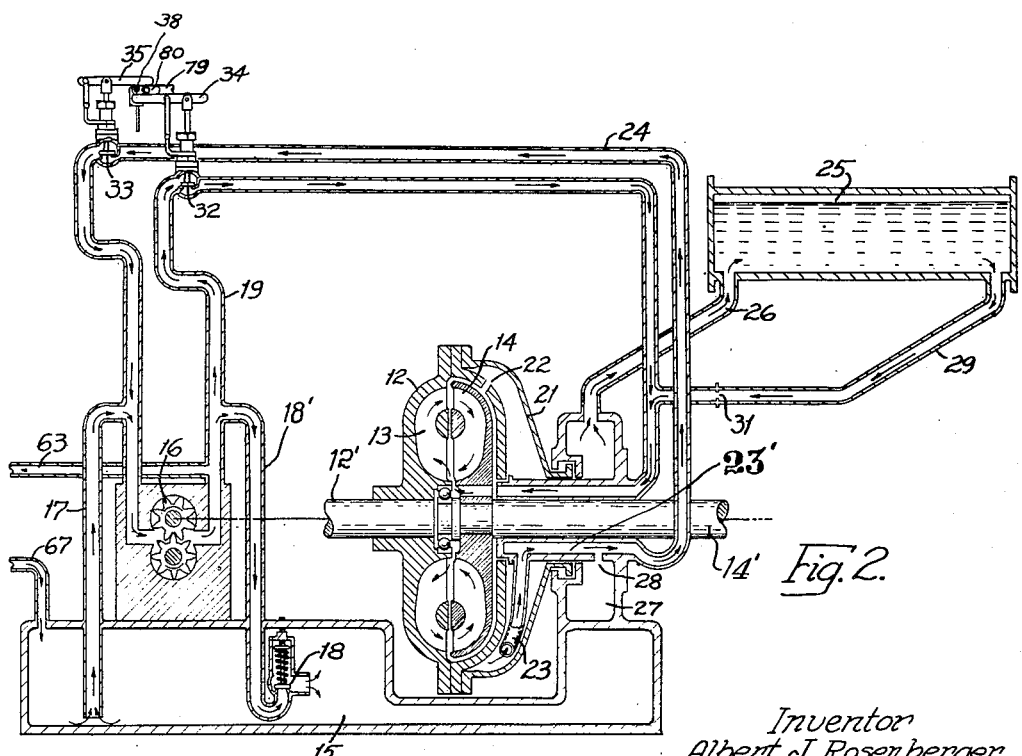
Figure 2 is a diagrammatic sectional view of a part of the system of Figure 1.
Figure 4:
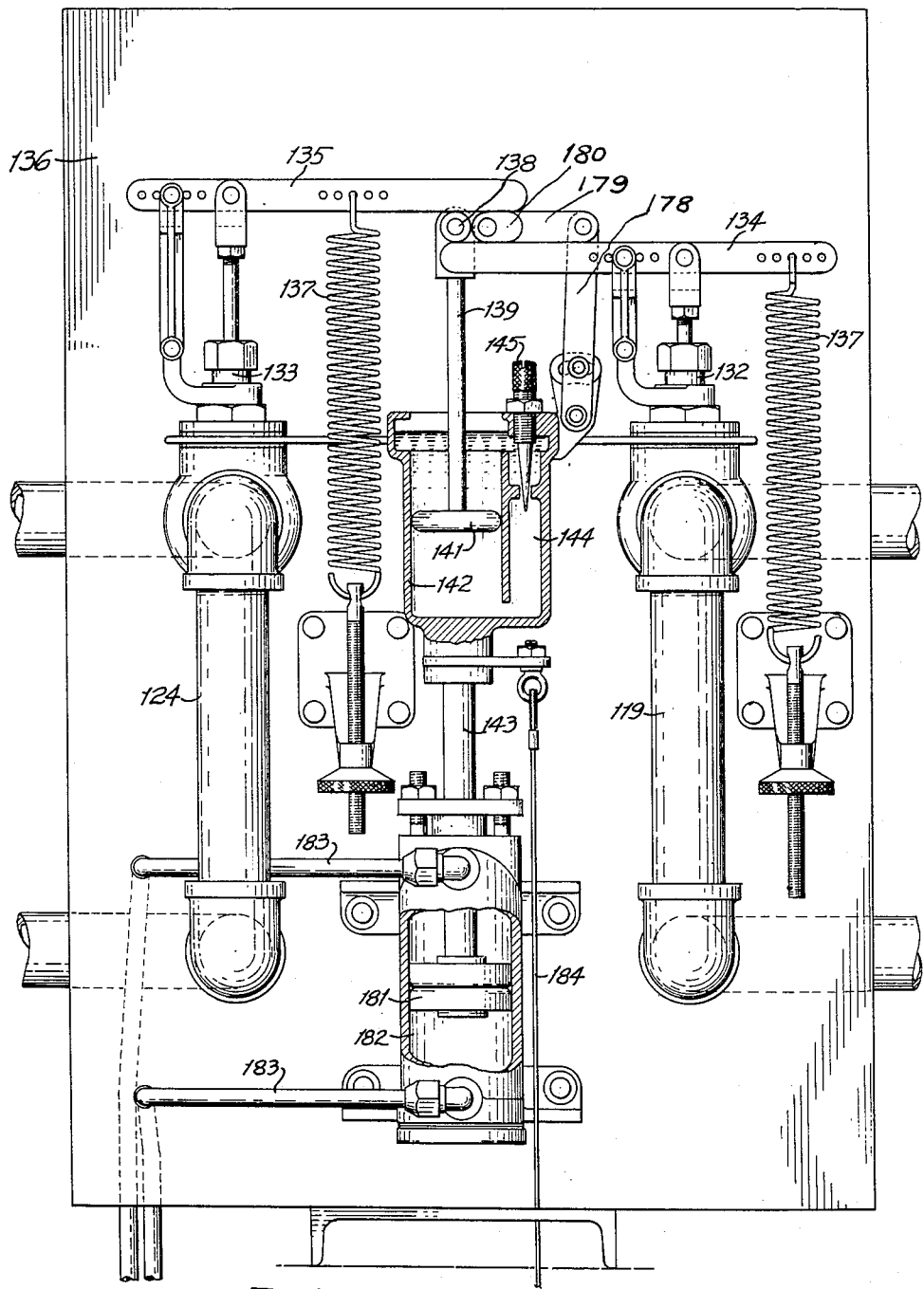
Figure 4 is an enlarged view similar to Figure 3 showing a modified construction.

Figure 4 illustrates a modified construction which is particularly useful where it is desired to mount the regulator at a point remote from the valves it controls and in which parts corresponding to like parts in Figures 1 to 3 are designated by the same reference numbers plus 100. In this form instead of connecting the dashpot cylinder 142 directly to the power element of the regulator, it is connected by a piston rod 143 to a power piston 181 which is slidably mounted in a cylinder 182 which is secured to the panel 136. Operating fluid is supplied to the cylinder 182 by pipes 183 leading from a pilot valve (not shown) which is controlled by a regulator as by the piston rod 68 of the regulator shown in detail in Figure 3. A wire 184 is preferably connected to the rod 143 and is connected to the pilot valve through a follow-up mechanism whereby the movement of the piston 181 will be in proportion to the movement of the regulator.

While only one application of my regulating method and one apparatus for carrying it out has been shown and described in detail it will be apparent that the same could be applied to the control of various other conditions and that numerous other changes could be made. It is accordingly not intended to be limited to the embodiments of the invention shown and described in detail or otherwise than by the terms of the appended claims.

What is claimed is:

1. A control system comprising a pair of control elements, one acting to increase and the other to decrease a condition, a regulator responsive to the condition, a dashpot cylinder moved by said regulator, a piston in said cylinder to move said control elements selectively as the regulator moves said cylinder in one direction or the other, and a cam moved by said cylinder and engageable with said control elements to displace one or the other of them except when the cylinder is in a central position.

2. A control system comprising a pair of control elements normally occupying predetermined neutral positions, means yieldingly urging said elements to said positions, one of said elements being effective to increase and the other to decrease a condition to be controlled, a regulator responsive to said condition and including a part movable in a direction and to an extent proportionally to changes in said condition, a dashpot having two relatively movable members, a connection from said part to one of said members, and means connected to the other of said members to move said control elements selectively as said part moves in one direction or the other.

3. A control system comprising a pair of control elements normally occupying predetermined neutral positions, one of said elements being effective to increase and the other to decrease a condition to be controlled, a regulator including an element sensitive to said condition and power means controlled by said sensitive element, said power means having a part moved thereby in a direction and to an extent proportional to changes in said condition, a connection from said part to said control elements to move the control elements to correct for any variation in said condition, a dash pot moved by said power means and connected to the sensitive element, and a spring connecting said part to the sensitive element.

4. A control system comprising a pair of control elements normally occupying predetermined neutral positions, one of said elements being effective to increase and the other to decrease a condition to be controlled, a regulator including an element sensitive to said condition and power means controlled by said sensitive element, said power means having a part moved thereby in a direction and to an extent proportional to changes in said condition, means including a dash pot connecting said part to the control elements to move the control elements upon movement of the power means, means yieldingly urging the control elements to their neutral positions to return them to their neutral positions through yielding of said dash pot after displacement therefrom by movement of said part, and a spring connecting said part to the sensitive element to give the regulator a position characteristic.

ALBERT J. ROSENBERGER.